United States Patent
Large

(10) Patent No.: US 7,365,453 B2
(45) Date of Patent: Apr. 29, 2008

(54) AQUEOUS SOLUTION PLATE CONTROL SYSTEM AND METHOD

(75) Inventor: Brian C. Large, Pueblo, CO (US)

(73) Assignee: The Water Company LLC, Pueblo, CO (US)

(*) Notice: Subject to any disclaimer, the term of this patent is extended or adjusted under 35 U.S.C. 154(b) by 138 days.

(21) Appl. No.: 10/955,020

(22) Filed: Sep. 30, 2004

(65) Prior Publication Data

US 2006/0081540 A1 Apr. 20, 2006

(51) Int. Cl.
*H01H 33/59* (2006.01)
*H02J 1/00* (2006.01)
*B01D 35/06* (2006.01)

(52) U.S. Cl. .......................... 307/115; 307/82; 210/748

(58) Field of Classification Search .................. 307/28, 307/75, 130, 115, 82; 210/748
See application file for complete search history.

(56) References Cited

U.S. PATENT DOCUMENTS

| | | | | |
|---|---|---|---|---|
| 5,254,878 A | * | 10/1993 | Olsen | 307/75 |
| 5,777,461 A | * | 7/1998 | Massie et al. | 323/282 |
| 5,932,938 A | * | 8/1999 | Shimamori | 307/125 |
| 6,259,172 B1 | * | 7/2001 | Lee | 307/125 |
| 6,768,658 B2 | * | 7/2004 | Perry | 363/65 |
| 6,897,636 B2 | * | 5/2005 | Harris | 323/272 |
| 7,105,947 B1 | * | 9/2006 | Marshall et al. | 307/28 |
| 7,265,601 B2 | * | 9/2007 | Ahmad | 327/403 |

* cited by examiner

*Primary Examiner*—Michael Sherry
*Assistant Examiner*—Michael Rutland-Wallis
(74) *Attorney, Agent, or Firm*—Darby & Darby P.C.

(57) ABSTRACT

A system for controlling the operation of conductive plates immersed in an aqueous solution, such as in water treatment applications. The system allows independent control of the current sourced or sunk by each of a plurality of plates. The system also allows each plate to be placed in a high-impedance state in which no appreciable current is sourced or sunk by the system. A plate or a group of plates is controlled by a control module which interfaces to a central controller such as a personal computer or a programmable logic controller. Multiple control modules can be added to a system to support multiple plates, each of which can be controlled individually from the central controller. Each control module is also capable of sensing voltage and current at its corresponding plate and providing that information to the central controller.

20 Claims, 3 Drawing Sheets

AQUEOUS SOLUTION PLATE CONTROL SYSTEM AND METHOD

FIELD OF THE INVENTION

The present invention relates to control systems and methods, and particularly to the electrical control of conductive plates in an aqueous solution processing system such as a water treatment system or the like.

BACKGROUND INFORMATION

In aqueous solution processing systems such as water treatment systems, a plurality of electrically conductive plates are typically immersed in the aqueous solution to be treated. Treatment may include, for example, controlling the Total Dissolved Solids (TDS) and pH levels of the solution by applying various voltages to the conductive plates.

It is desirable that the voltages applied to the various plates are controllable independently over a range of voltages defined by upper and lower (e.g., ground) rail voltages. Depending on the voltages of adjacent plates, a given plate may sink and/or source current. It is further desirable that each plate be able to source or sink a sufficient amount of current for a given application (e.g., at least 5 A) while maintaining a stable voltage. It is also desirable in some cases that a plate take on a high impedance, on demand, and neither sink nor source any significant current.

Another desirable feature is that the system be readily configurable for different numbers of plates. A modular architecture would be desirable in this regard.

Such plate control systems should also be able to operate over industrial temperature ranges (e.g., −20° C. to +65°C.) and be cost effective (e.g., less than $100 per plate).

Unfortunately, there is no known conventional system that possesses any more than a subset of the above-described features. A need therefore exists for a plate control system which provides all of these features.

SUMMARY OF THE INVENTION

In an exemplary embodiment, the present invention provides a system for controlling the operation of conductive plates immersed in an aqueous solution, such as in water treatment applications. The system allows independent control of the current sourced or sunk by each of a plurality of plates. The system also allows each plate to be placed in a high-impedance state in which no appreciable current is sourced or sunk by the system. A plate is controlled by a control module which interfaces to a central controller such as a personal computer or a programmable logic controller. Multiple control modules can be readily added to a system to support multiple plates, each of which can be controlled individually from the central controller. Each control module is also capable of sensing voltage and current at its corresponding plate and providing that information to the central controller.

These and other aspects of the present invention are described below.

DETAILED DESCRIPTION

Figure 1:
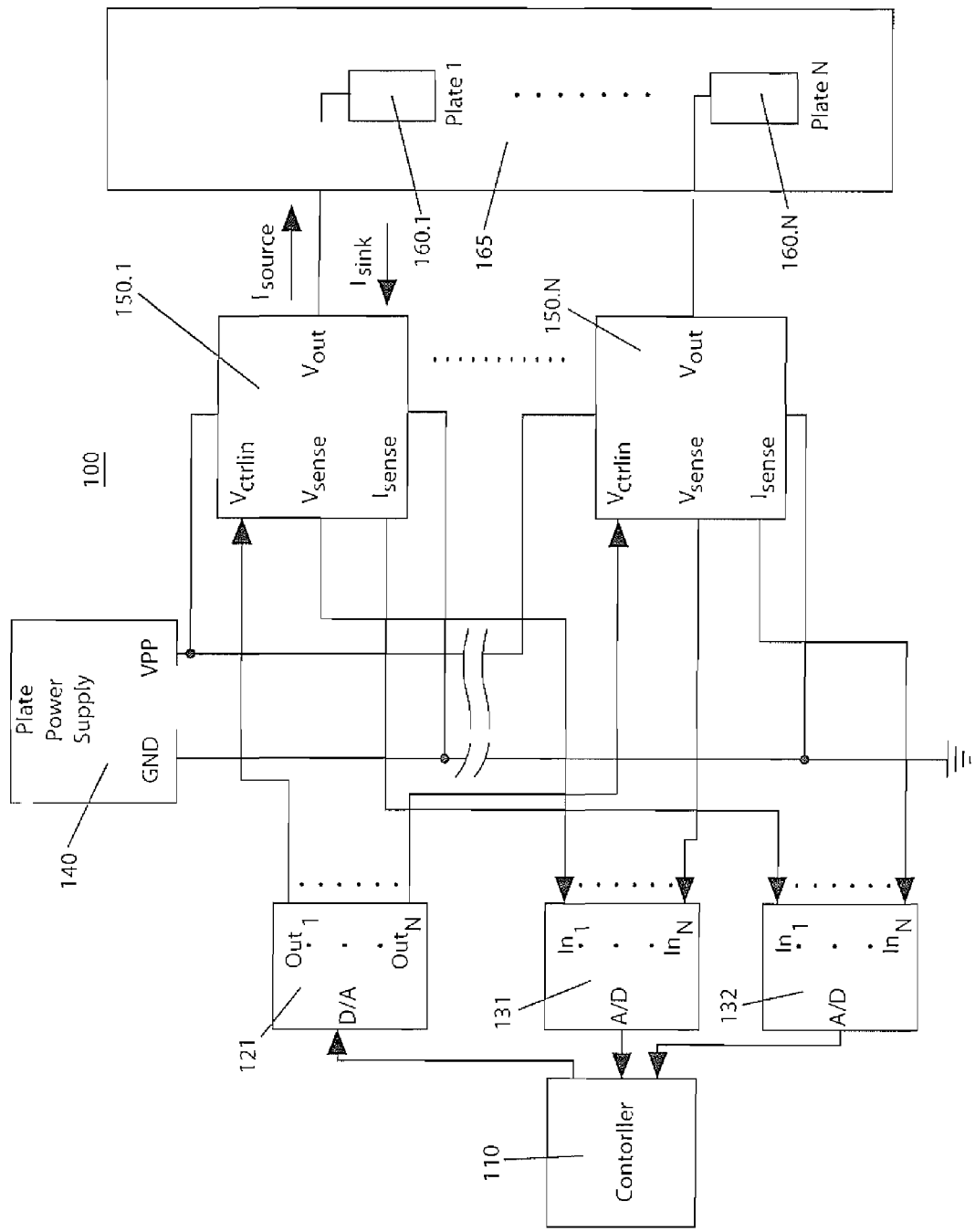
FIG. 1 shows a block diagram of an exemplary control system in accordance with the present invention.

An exemplary embodiment of a control system 100 in accordance with the present invention is shown in FIG. 1.

The control system 100 is used to control the power applied to a plurality of plates 160.1-160.N arranged in a housing 165 in which an aqueous solution is contained. The system 100 comprises a plurality of control modules 150.1-150.N, each of which is assigned to a corresponding plate 160.1-160.N. As described in greater detail below, each control module 150 controls the voltage and conduction state (i.e., sinking current, sourcing current, high-impedance) of the corresponding plate 160 in accordance with a control voltage input ($V_{ctrlin}$)

In the exemplary embodiment shown, each control module 150 also has the capability of sensing the voltage on the corresponding plate 160 and providing an output ($V_{sense}$) indicative of the sensed voltage. Each control module 150 may also have the capability of sensing the current sourced to or sunk from the corresponding plate 160 and providing an output ($I_{sense}$) indicative of the sensed current.

Although one plate 160 is shown coupled to each control module 150, it is possible to coupled multiple plates 160 to the same control module 150.

In the exemplary embodiment shown, the modules 150 interface with a central controller 110 via a multi-channel digital-to-analog (D/A) converter 121 and multi-channel analog-to-digital (A/D) converters 131 and 132. The controller 110 interfaces with the converters 121, 131 and 132 via digital interfaces (serial or parallel) to control the $V_{ctrlin}$ input of each control module 150 and to monitor the voltages and currents sensed by each control module 150. The controller 110 can thus control the conduction state and voltage of each plate 160 individually and can monitor the voltage and current of each plate 160 individually. The sensed voltage and/or current at the plate 160 can be used by the controller 110 in a feedback loop to control the respective control module 150 to maintain a particular voltage and/or current for that plate.

The controller 110 may be implemented with a general-purpose personal computer (PC), a programmable logic controller (PLC) or the like, executing procedures for controlling and monitoring the states of the plates 160. The controller 110 also preferably provides a user interface (e.g., via standard input/output devices such as a keyboard and display) to allow a user to monitor or modify the operation of the system.

A power supply 140 is included for providing regulated power to each plate 160 via its corresponding control module 150. The specifications of the power supply 140 will depend on the size of the system (e.g., the number of plates 160), the voltages to be applied to the plates, and the current sinking and sourcing requirements. In an exemplary embodiment, the power supply 140 provides regulated 12 volt power and is capable of handling at least 5 amperes per plate 160.

The system 100 can be readily expanded to handle additional plates 160 by adding additional control modules 150. If need be, additional D/A and A/D converters 121, 131, 132 and power supplies 140 can also be readily added.

Several variations of the arrangement shown in FIG. 1 are possible within the scope of the present invention. For example, the D/A and A/D converters can be incorporated into the control modules 150, thus providing digital interfaces at the modules. Alternatively, the D/A and A/D converters can be discrete components or incorporated into the controller 110 with plug-in cards.

In an exemplary embodiment, the controller 110 is implemented using a model 5610 controller available from Octagon Systems of Westminster, Colo. The D/A converters 121 and A/D converters 131, 132 can be implemented using model 3313 and 3181 converters, also from Octagon Systems. The plate power supply 140 can be implemented using model DR120-12 power supplies from Meanwell Enterprises Co., Ltd., of Taiwan.

Figure 2:
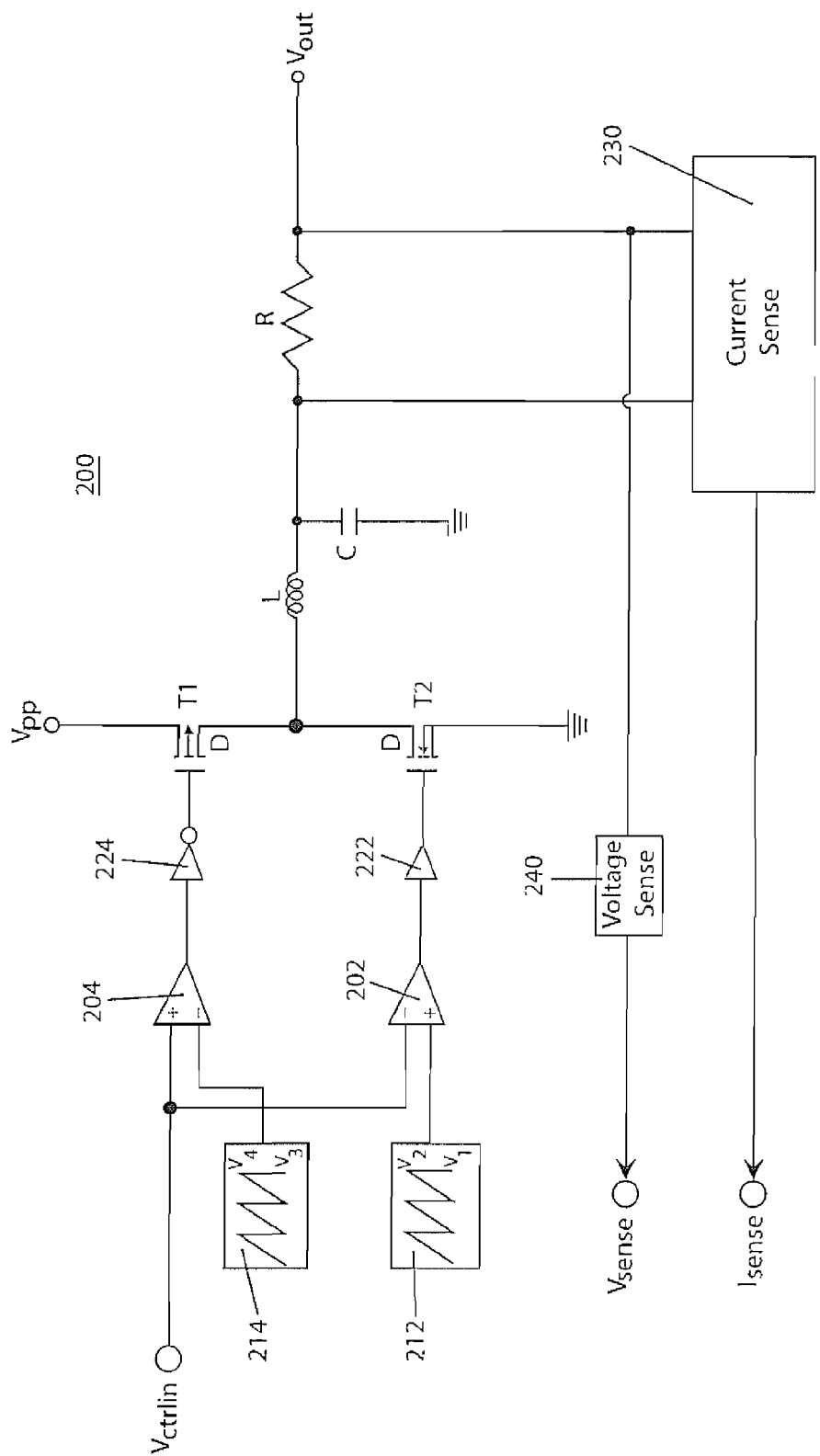
FIG. 2 shows a schematic diagram of an exemplary embodiment of a control module in accordance with the present invention.

FIG. 2 shows a schematic diagram of an exemplary embodiment of a control module 200 such as would be used as a control module 150 in the system 100 described above. The operation of the control module 200 will be described more fully below with reference to FIG. 3.

As mentioned above, the operation of each control module 200 is controlled by an input signal $V_{ctrlin}$. In an exemplary embodiment, the input $V_{ctrlin}$ is a signal whose voltage may vary between 0 and 5 volts (under the control of the central controller 110). When generated by a 12-bit D/A converter, $V_{ctrlin}$ can be varied in increments of 1.22 mV over the exemplary 5 volt range. The signal $V_{ctrlin}$ is provided to the inverting input of a first comparator 202 and to the non-inverting input of a second comparator 204.

The output of a first saw-tooth generator 212 is coupled to the non-inverting input of the comparator 202 and the output of a second saw-tooth generator 214 is coupled to the inverting input of the comparator 204. The first saw-tooth generator 212 generates a repetitive saw-tooth pattern of pulses which ramp between the voltages $V_1$ and $V_2$, whereas the second saw-tooth generator 214 generates a repetitive saw-tooth pattern of pulses which ramp between the voltages $V_3$ and $V_4$.

The two saw-tooth generators may or may not be oscillating at the same frequency and may or may not be in synchronization with each other. In an exemplary embodiment, both saw-tooth generators oscillate at approximately 10 kHz and are synchronized. (As will be understood more clearly below, it may be advantageous that the saw-tooth generators of different control modules 150 not be synchronized so as to reduce the peak current demands of the plate power supply 140.)

In an exemplary embodiment, $V_4>V_3>V_2>V_1$, where $V_4$ is less than or equal to the maximum voltage of $V_{ctrlin}$ (e.g., 5 volts) and $V_1$ is greater than or equal to the minimum voltage of $V_{ctrlin}$ (e.g., 0 volts).

The saw-tooth generators 212, 214 can be implemented in a variety of ways well known in the art. In an exemplary embodiment, the second saw-tooth generator 214 can be implemented using a level-shifter which shifts the output of the first saw-tooth generator 212 by summing a DC offset voltage thereto to generate the second saw-tooth pattern.

The output of the comparator 202 drives the gate of a N-channel metal oxide semiconductor (NMOS) transistor T2 via a buffer 222, whereas the output of the comparator 204 drives the gate of a P-channel metal oxide semiconductor (PMOS) transistor T1 via an inverter 224. In an exemplary embodiment, T1 is an IRF4905 power MOSFET and T2 is an IRF861N15D power MOSFET, available from International Rectifier Corporation of El Segundo, Calif. In alternative embodiments, the transistors T1 and T2 can be replaced by other suitable switching devices, such as relays, analog switches, or the like.

The transistors T1 and T2 are arranged in series between the plate supply voltage $V_{PP}$ (provided by the power supply 140) and ground. The source of T1 is coupled to $V_{PP}$, the drain of T1 is coupled to the drain of T2 and the source of T2 is coupled to ground. The drains of the transistors T1 and T2 are coupled to a first terminal of an inductor L, the second terminal of which is coupled to a capacitor C to ground and to a first terminal of a resistor R. The second terminal of the resistor R is coupled to the output $V_{out}$ of the module 200 which is coupled to the corresponding plate 160. (See FIG. 1.) When T1 is actuated, or turned on, a low impedance path is provided between the control module output $V_{out}$ and $V_{PP}$. When T2 is turned on, a low impedance path is provided between the control module output $V_{out}$ and ground.

The combination of the inductor L and capacitor C act to filter the signal generated at the drains of the transistors T1 and T2. The optimal values of L and C will depend primarily on the frequency at which T1 and T2 are switched. In an exemplary embodiment in which T1 and T2 are switched at 10 kHz, L has a nominal value of 4.7 μH and C has a nominal value of 5,400 μF. In an exemplary embodiment, a low-pass filter with a cut-off frequency of approximately $\frac{1}{10}^{th}$ of the saw-tooth oscillator frequency is used.

The terminals of the resistor R are coupled to a current sensing circuit 230 which senses the voltage drop across R. The current sensing circuit 230 can be implemented using a differential amplifier with high-impedance inputs which draw negligible current. The resistor R is preferably a high-precision (e.g., +/−1%), low value (e.g., 0.01 ohm) resistor. The voltage drop across R is amplified by the current sensing circuit 230 to generate the signal $I_{sense}$, which is indicative of the current through R and thus the current through the plate 160.

The control module output $V_{out}$ is coupled to a voltage sense circuit 240 which generates the signal $V_{sense}$ indicative of the voltage at the plate 160. The voltage sense circuit 240 may include a resistor divider for scaling the sensed voltage or a buffer to drive the $V_{sense}$ output without appreciably loading the output.

The operation of the module 200 will now be described with reference to the signal diagram of FIG. 3.

Figure 3:
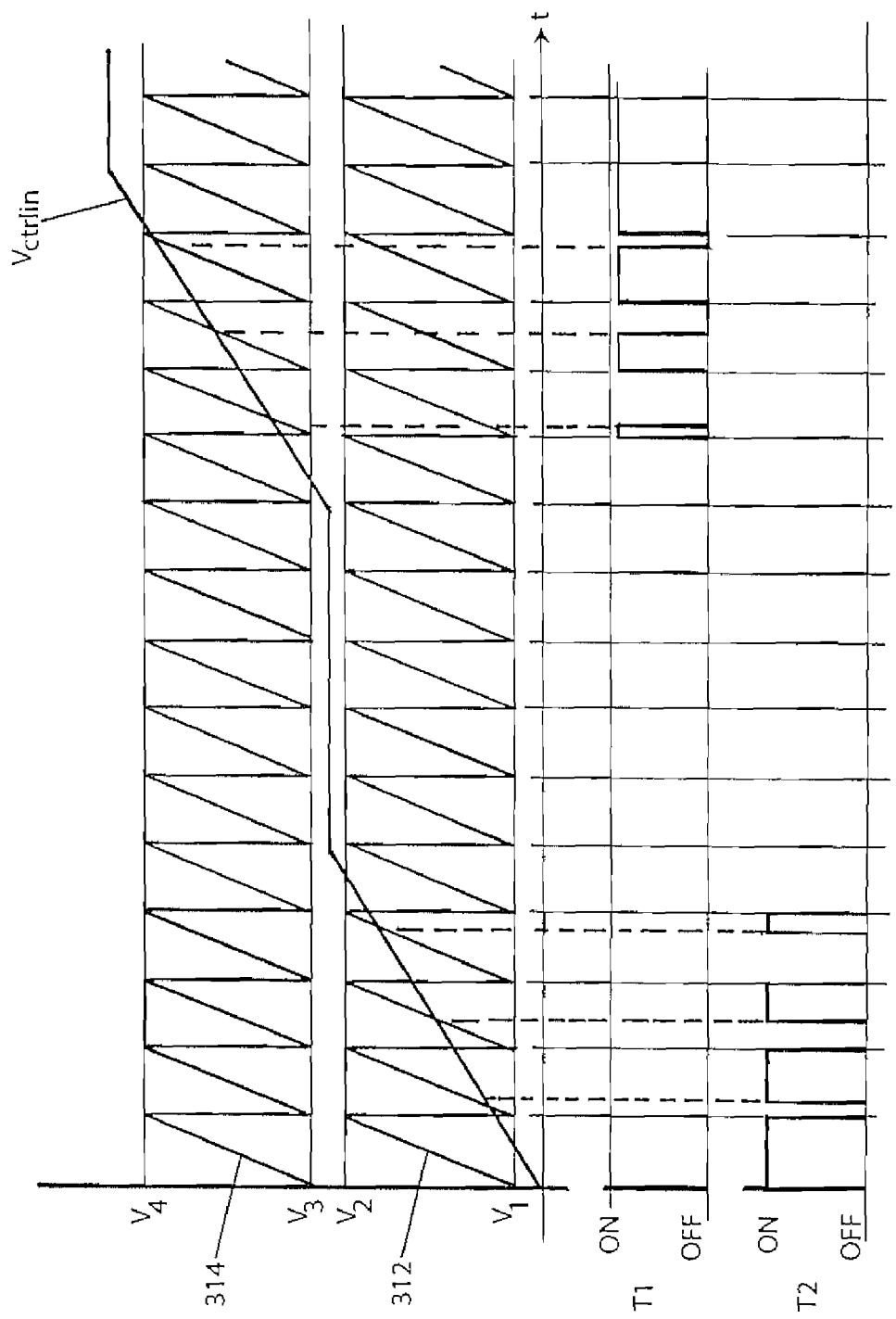
FIG. 3 shows the time variation of various signals of the control module of FIG. 2.

In the signal diagram of FIG. 3, the output of the first saw-tooth generator 212 is shown as signal trace 312 and the output of the second saw-tooth generator 214 is shown as signal trace 314. Superimposed thereon is an exemplary progression of the input signal $V_{ctrlin}$ from a minimum voltage (e.g., 0 volts) to a maximum voltage (e.g., 5 volts). The resultant states of the transistors T1 and T2 are shown below. The progression of $V_{ctrlin}$ shown in FIG. 3 was chosen to illustrate the operation of the module 200. Naturally, $V_{ctrlin}$ can follow a variety of patterns and can change at various rates as dictated by the device which generates it.

In the exemplary embodiment shown, each saw-tooth pulse ramps linearly from a minimum level ($V_1$, $V_3$) to a maximum level ($V_2$, $V_4$) and then steps down at a substantially faster rate back to the minimum level. This pattern is repeated once per cycle.

With reference to FIG. 2, when the control voltage $V_{ctrlin}$ is below the voltage output of the saw-tooth generator 212, the comparator 202 generates a high level output which, through the buffer 222, causes the transistor T2 to turn on. At the same time, because $V_3>V_2$, the control voltage $V_{ctrlin}$ will be below the voltage output of the saw-tooth generator 214, in which case the comparator 204 will generate a low level output which is inverted by the inverter 224 to a high level causing the transistor T1 to be off. With T2 on and T1 off, the control module output $V_{out}$ will sink current from the plate 160 to which it is coupled. The actual voltage on the plate 160 will depend on the current sunk, the voltages of the surrounding plates that are sourcing the current, and the impedance of the solution in which the plates are immersed.

As shown in FIG. 3, when $V_{ctrlin} \leq V_1$, both T2 will be on continuously and T1 will be off continuously. The control module 200 will be sinking the maximum current possible and the voltage at the control module output will be at the minimum level possible.

When $V_1 < V_{ctrlin} < V_2$, $V_{ctrlin}$ will be above the output of the saw-tooth generator for a portion of each pulse and below the output of the saw-tooth generator for the remainder of each pulse. In that case, as shown in FIG. 3, T2 will be on during the portion of each pulse that $V_{ctrlin}$ is below the generator output. As $V_{ctrlin}$ rises within the range $V_1$ to $V_2$, as shown in FIG. 3, T2 will be on for shorter portions of each pulse cycle. In other words, the duty cycle of the activation of T2 decreases as $V_{ctrlin}$ increases within the range $V_1$ to $V_2$. As the duty cycle of the activation of T2 decreases, the amount of current sunk by the control module decreases and the voltage at the plate 160 increases accordingly.

When $V_2 \leq V_{ctrlin} \leq V_3$, both T1 and T2 will be off. In this case, the output of the control module appears as a high impedance and no appreciable current is sourced or sunk by the control module. The voltage attained by the plate 160 will depend on the voltages of the surrounding plates and the impedance of the solution in which they are immersed. In a further exemplary embodiment, if such a high-impedance operating mode is not required, then $V_3$ and $V_2$ can be selected to be substantially equal. It is desirable to provide a small gap between $V_2$ and $V_3$ in order to avoid a condition in which T1 and T2 are both on at the same time.

When $V_3 < V_{ctrlin} < V_4$, $V_{ctrlin}$ will be above the output of the saw-tooth generator for a portion of each pulse and below the output of the saw-tooth generator for the remainder of each pulse. In that case, as shown in FIG. 3, T1 will be on during the portion of each pulse that $V_{ctrlin}$ is above the generator output. As $V_{ctrlin}$ rises within the range $V_3$ to $V_4$, as shown in FIG. 3, T1 will be on for longer portions of each pulse cycle. In other words, the duty cycle of the activation of T1 increases as $V_{ctrlin}$ increases within the range $V_3$ to $V_4$. As the duty cycle of the activation of T1 increases, the amount of current sourced by the control module increases and the voltage at the plate 160 increases accordingly.

When $V_{ctrlin} \geq V_4$, T1 will be on continuously. The control module 200 will be sourcing the maximum current possible and the voltage at the control module output will be at the maximum level possible.

Note that in accordance with the above described operation of the exemplary control module 200, only one (or neither) of the transistors T1 and T2 can be on at any one time.

In an exemplary embodiment, $V_{ctrlin}$ can vary from 0.0 volts to 5.0 volts, $V_1 = 0.7$ volts, $V_2 = 2.67$ volts, $V_3 = 2.9$ volts, and $V_4 = 4.9$ volts.

Moreover, the present invention is not limited to the exemplary saw-tooth pulse waveform shown. For example, instead of ramping up and stepping down sharply, each pulse could step up sharply and then ramp down, or ramp up and ramp down more symmetrically (i.e., a "triangular" waveform). Moreover, the ramping need not be linear but may be exponential or follow a different trajectory to achieve different effects. For example, a pulse waveform with a high ramp rate will provide finer control of the output voltage for a given change in the control input voltage.

As can be appreciated, optimal component values and operating parameters will depend on particular applications and operating conditions. For example, the frequency of the saw-tooth generators can be selected over a wide range of values (e.g., 5 kHz to 1 MHz). Lower frequencies will tend to cause greater output voltage ripple and require larger component sizes for the capacitor C and inductor L to provide adequate filtering. Higher frequencies will yield higher switching losses and greater electromagnetic noise generation.

It is to be understood that while the invention has been described above in conjunction with preferred embodiments, the description is intended to illustrate and not to limit the scope of the invention, as defined by the appended claims. Indeed, various modifications of the invention in addition to those described herein will become apparent to those skilled in the art from the foregoing description and the accompanying figures. Such modifications are intended to fall within the scope of the appended claims.

It is further to be understood that all values are to some degree approximate, and are provided for purposes of description.

The disclosures of any patents, patent applications, and publications that may be cited throughout this application are incorporated herein by reference in their entireties.

What is claimed is:

1. A control system comprising: a control module, the control module including:
    a first switch, the first switch providing a low impedance path between a control module output and a first voltage when the first switch is actuated, wherein the actuated first switch sinks current from the control module output;
    a second switch, the second switch providing a low impedance path between the control module output and a second voltage when the second switch is actuated, wherein the actuated second switch sources current to the module output; and
    a switch control circuit for controlling the first and second switches in accordance with a control module input, wherein the first switch is periodically actuated when the control module input is at a first state, the second switch is periodically actuated when the control module input is at a second state different from the first state, and neither switch is actuated when the control module input is at a third state wherein in the third state a high impedance is presented at the control module output, and no appreciable current is sourced or sunk through the control module.

2. The control system of claim 1, wherein the switch control circuit includes:
    a first signal generator, the first signal generator generating a first periodic signal pattern between a first and a second level, the second level being greater than the first level;
    a second signal generator, the second signal generator generating a second periodic signal pattern between a third and a fourth level, the fourth level being greater than the third level and the third level being at least as great as the second level;
    a first comparator, the first comparator controlling the actuation of the first switch in accordance with a comparison of the control module input and the first periodic signal pattern;
    a second comparator, the second comparator controlling the actuation of the second switch in accordance with a comparison of the control module input and the second periodic signal pattern, wherein the first state is between the first and second levels, the second state is between the third and fourth levels and the third state is between the second and third levels.

3. The control system of claim 2, wherein the first and second periodic signal patterns comprise pulses having at least one of a saw-tooth, triangular and exponential waveform.

4. The control system of claim 2, wherein the first comparator causes the actuation of the first switch when the control module input is below the first periodic signal pattern.

5. The control system of claim 2, wherein the second comparator causes the actuation of the second switch when the control module input is above the second periodic signal pattern.

6. The control system of claim 1, wherein the control module includes
a current sense circuit, the current sense circuit generating a signal indicative of a current at the control module output.

7. The control system of claim 1, wherein the control module includes:
a voltage sense circuit, the voltage sense circuit generating a signal indicative of a voltage at the control module output.

8. The control system of claim 1 comprising a digital to analog converter having an output coupled to the control module input.

9. The control system of claim 6 comprising an analog to digital converter having an input coupled to the signal indicative of the current at the control module output.

10. The control system of claim 7 comprising an analog to digital converter having an input coupled to the signal indicative of the voltage at the control module output.

11. The control system of claim 1 comprising a controller for controlling the control module via the control module input.

12. The control system of claim 8 comprising a controller coupled to an input of the digital to analog converter.

13. The control system of claim 1, wherein the control module includes:
a current sense circuit, the current sense circuit generating a signal indicative of a current at the control module output; and
a voltage sense circuit, the voltage sense circuit generating a signal indicative of a voltage at the control module output.

14. The control system of claim 13 comprising:
a first analog to digital converter having an input coupled to the signal indicative of the current at the control module output; and
a second an analog to digital converter having an input coupled to the signal indicative of the voltage at the control module output.

15. The control system of claim 14 comprising a digital to analog converter having an output coupled to the control module input.

16. The control system of claim 15 comprising a controller coupled to an input of the digital to analog converter, an output of the first analog to digital converter and an output of the second analog to digital converter.

17. The control system of claim 1 comprising:
a controller;
a further control module, the further control module being similar to the control module; and
a power supply,
wherein the control module and the further control module are coupled to the power supply and to the controller.

18. The control system of claim 17, wherein each of the control module and the further control module is coupled to the controller via a digital to analog converter.

19. The control system of claim 18, wherein each of the control module and the further control module is coupled to the controller via an analog to digital converter.

20. The control system of claim 1, wherein the first switch is periodically actuated with a first duty cycle and the second switch is periodically actuated with a second duty cycle, the first and second duty cycles varying in accordance with the control module input.

* * * * *